United States Patent
Kabasawa

(10) Patent No.: US 6,763,234 B1
(45) Date of Patent: Jul. 13, 2004

(54) METHOD OF CONTROLLING INTERSYSTEM HAND-OFF BY SUBTRACTING MARGIN VALUE FROM PILOT SIGNAL STRENGTH OF OTHER SYSTEM

(75) Inventor: Shizuko Kabasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 597 days.

(21) Appl. No.: 09/626,111

(22) Filed: Jul. 26, 2000

(30) Foreign Application Priority Data

Jul. 28, 1999 (JP) .......................................... 11-212997

(51) Int. Cl.⁷ ................................................ H04Q 7/20
(52) U.S. Cl. ...................... 455/436; 455/439; 370/320; 370/331
(58) Field of Search ................................ 455/436, 440, 455/444, 439, 438; 370/320, 330, 331, 332, 335, 342, 441

(56) References Cited

U.S. PATENT DOCUMENTS

| | | | | |
|---|---|---|---|---|
| 5,422,933 A | * | 6/1995 | Barnett et al. ............... | 455/439 |
| 5,557,657 A | * | 9/1996 | Barnett ........................ | 455/444 |
| 5,697,055 A | * | 12/1997 | Gilhousen et al. .......... | 455/436 |
| 5,917,811 A | * | 6/1999 | Weaver, Jr. et al. ........ | 370/332 |
| 5,926,470 A | * | 7/1999 | Tiedemann, Jr. ............ | 370/334 |
| 5,937,019 A | * | 8/1999 | Padovani .................... | 375/358 |
| 5,999,816 A | * | 12/1999 | Tiedemann, Jr. et al. ... | 455/437 |
| 6,256,501 B1 | * | 7/2001 | Tokuyama et al. .......... | 455/442 |
| 6,304,755 B1 | * | 10/2001 | Tiedemann, Jr. et al. ... | 455/437 |
| 6,321,090 B1 | * | 11/2001 | Soliman ...................... | 455/440 |
| 6,434,390 B2 | * | 8/2002 | Rahman ...................... | 455/440 |
| 6,438,378 B1 | * | 8/2002 | Kouno ........................ | 455/439 |
| 2002/0086692 A1 | * | 7/2002 | Chheda et al. .............. | 455/522 |

FOREIGN PATENT DOCUMENTS

| | | |
|---|---|---|
| JP | 7-46647 | 2/1995 |
| JP | 10-155173 | 6/1998 |
| JP | 10-336723 | 12/1998 |
| JP | 11-122654 | 4/1999 |
| KR | 99-56030 | 7/1999 |

OTHER PUBLICATIONS

Japanese Office Action dated Oct. 2, 2001, with partial English translation.

* cited by examiner

*Primary Examiner*—Cong Van Tran
(74) *Attorney, Agent, or Firm*—McGinn & Gibb, PLLC

(57) ABSTRACT

A CDMA mobile communication system carries out a method of controlling an intersystem hand-off by subtracting a margin value from a pilot signal strength of another system. A detector detects information in a report from the mobile station, representing the signal strength of the pilot signal from the base station. A changer subtracts a corresponding margin value from the detected pilot signal strength, thereby changing the pilot signal strength. The executing unit executes an intersystem hand-off to the other system if the pilot signal strength changed by the changing means exceeds a predetermined threshold value.

3 Claims, 6 Drawing Sheets

METHOD OF CONTROLLING INTERSYSTEM HAND-OFF BY SUBTRACTING MARGIN VALUE FROM PILOT SIGNAL STRENGTH OF OTHER SYSTEM

BACKGROUND OF THE INVENTION

1. Field of the Invention

The present invention relates to a CDMA (Code Division Multiple Access) mobile communication system and a method of controlling intersystem hand-off in such a CDMA mobile communication system, and more particularly to a method of controlling intersystem hand-off in a mobile communication system which employs a CDMA communication process.

2. Description of the Related Art

According to a conventional CDMA communication process based on IS-95 standards provided for by TIA (Telecommunication Industry Association) of the USA, a mobile station measures from time to time the strengths of pilot signals transmitted from the base station of a cell with which the mobile station is communicating and the base station of a nearby cell.

A network to which the mobile station is connected informs, in advance, the mobile station of information including a pilot signal strength condition indicating the availability of a cell and a pilot signal strength condition indicating the unavailability of a cell. The mobile station checks the measured pilot signal strengths against the supplied pilot signal strength conditions, and reports a pilot signal strength measurement message (hereinafter referred to as "measurement message") to the network when the measured pilot signal strengths undergo a state change.

Based on the measurement message from the mobile station, the network determines an added cell and a deleted cell, and performs hand-off control on the channel in use. Cells refer to regions which are managed by the network. The above CDMA communication process is disclosed in Japanese laid-open patent publications Nos. 10-336723 and 11-122654.

According to the above conventional CDMA communication process, if another CDMA communication system or an analog system exists adjacent to the CDMA mobile communication system in question, then a hand-off occurs to the adjacent system in a system boundary. In the case where a cell covered by the other system and a cell covered by the CDMA mobile communication system in question are too close to each other or a pilot signal strength of the other system is stronger, if an intersystem handoff is executed based solely on the report from the mobile station, then the hand-off is carried out too early, and the boundary cell becomes small.

Furthermore, according to the above conventional CDMA communication process, in the case where a cell covered by the CDMA mobile communication system in question and a cell covered by the other system are close to each other, if an intersystem handoff is executed based on the report from the mobile station, then a pilot signal strength of the cell covered by the CDMA mobile communication system in question occasionally appears strong immediately after the mobile station has moved to the cell covered by the other system. Consequently, the mobile station reports a measurement message, causing a hand-off to be repeated between the systems. Since an intersystem hand-off is a hard hand-off, it inevitably results in a short break that disrupts the speech quality of the call.

SUMMARY OF THE INVENTION

It is therefore an object of the present invention to provide a CDMA mobile communication system capable of solving the conventional problems and reducing short breaks due to hard hand-offs for thereby improving the speech quality of calls, and a method of controlling intersystem hand-off in such a CDMA mobile communication system.

A CDMA mobile communication system according to the present invention has a plurality of base stations, a base station controller for controlling the base stations, and a mobile station for reporting the signal strengths of pilot signals from the base stations to the base station to which the mobile station is connected. The base station controller comprises storage means, detecting means, changing means, and executing means.

The storage means stores margin values associated with respective cells as regions managed by base stations of an adjacent other system, which margin values are to be subtracted from the signal strengths of pilot signals of the base stations of the adjacent other system. The detecting means detects information contained in a report from the mobile station and representing the signal strength of the pilot signal from the base station. If the signal strength of the pilot signal from the base station is detected by the detecting means, the changing means subtracts a corresponding margin value stored in the storage means from the detected signal strength of the pilot signal for thereby changing the signal strength of the pilot signal. The executing means executes an intersystem hand-off to the other system if the signal strength of the pilot signal changed by the changing means exceeds a predetermined threshold value.

According to the present invention, there is also provided a method of controlling an intersystem hand-off to switch a mobile station connected to a base station of its own system to a base station of an adjacent other system. The method comprises the steps of detecting information contained in a report from the mobile station and representing the signal strength of a pilot signal from the base station, and if the signal strength of the pilot signal from the base station is detected, subtracting a corresponding margin value from the detected signal strength of the pilot signal for thereby changing the detected signal strength of the pilot signal, and executing an intersystem hand-off to the other system if the changed signal strength of the pilot signal exceeds a predetermined threshold value.

In the case where there is a movable system adjacent to the CDMA mobile communication system, as described above, the radius of a cell at a system boundary is not reduced, and an intersystem hand-off is prevented from being repeated when the mobile station is to move between the systems. Therefore, short breaks due to unwanted hard hand-offs are reduced, making it possible to improve the speech quality of calls.

The above and other objects, features, and advantages of the present invention will become apparent from the following description with reference to the accompanying drawings which illustrate examples of the present invention.

DETAILED DESCRIPTION OF THE PREFERRED EMBODIMENT

Figure 1:
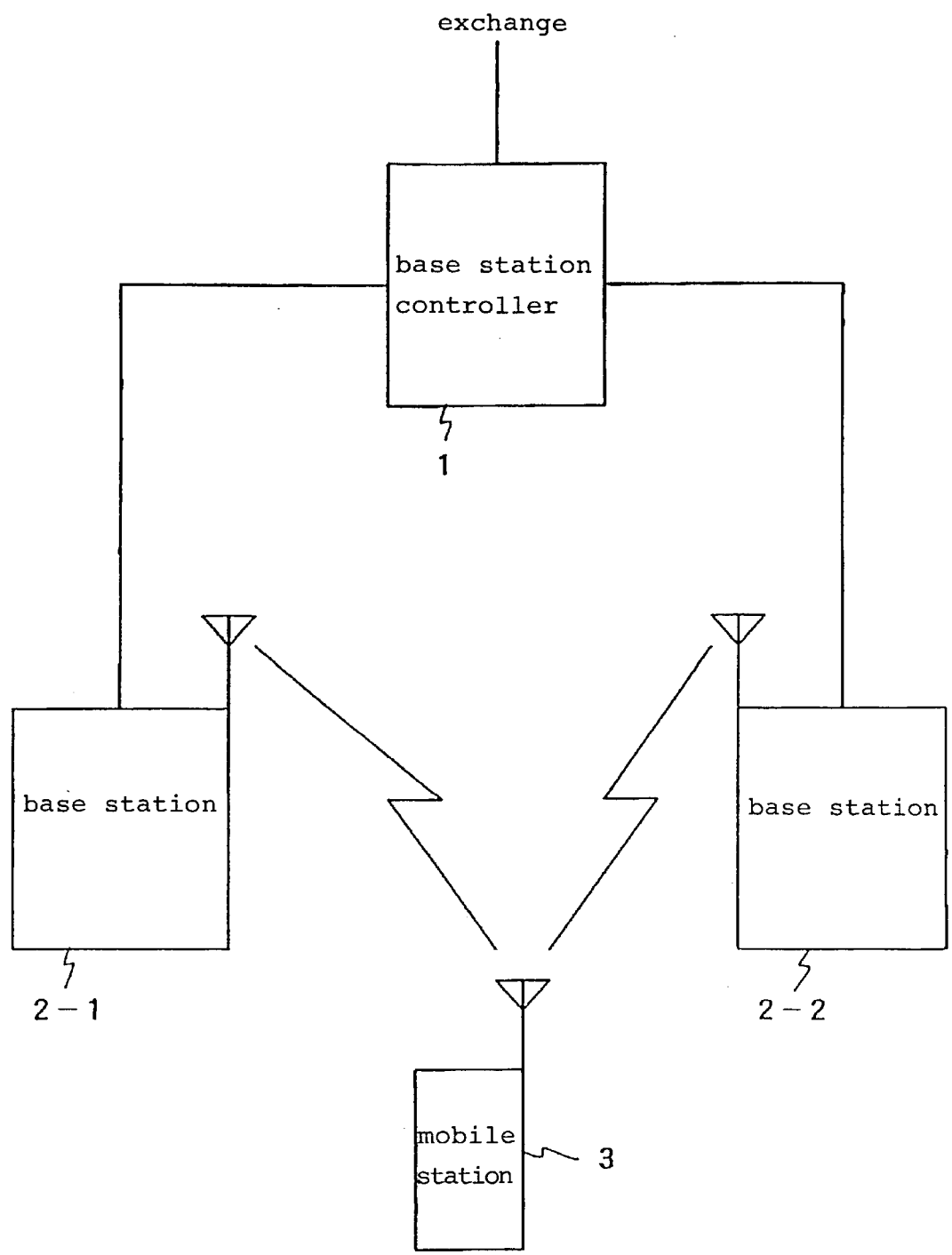
FIG. 1 is a block diagram of a CDMA mobile communication system according to an embodiment of the present invention.

As shown in FIG. 1, a CDMA mobile communication system according to an embodiment of the present invention comprises a base station controller 1, base stations 2-1, 2-2, and a mobile station 3.

Figure 2:
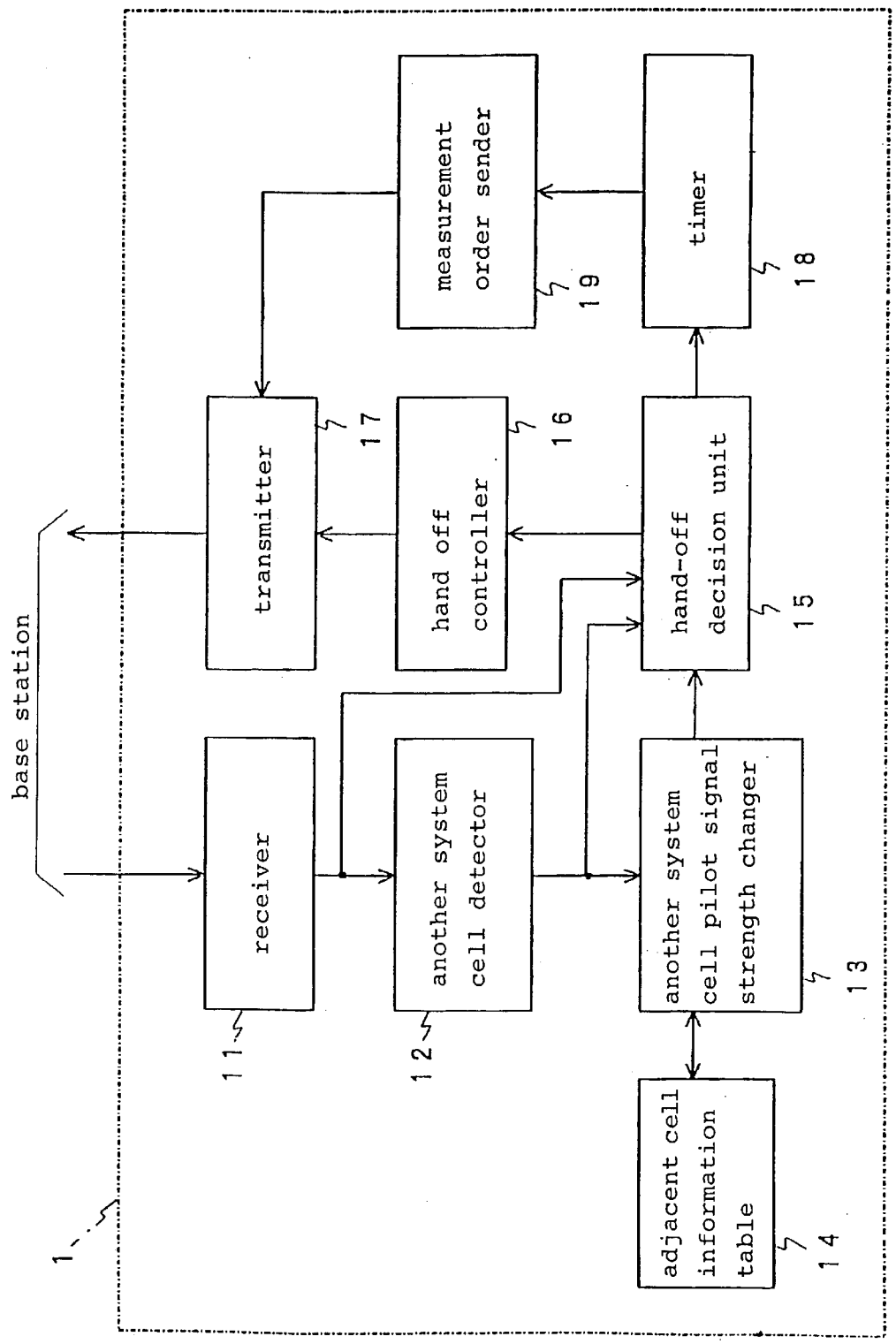
FIG. 2 is a block diagram of a base station controller of the CDMA mobile communication system according to the embodiment of the present invention.

As shown in FIG. 2, the base station controller 1 comprises a receiver 11, an other system cell detector (hereinafter referred to as "detector") 12, an other system cell pilot signal strength changer (hereinafter referred to as "changer") 13, an adjacent cell information table 14, a hand-off decision unit 15, a hand-off controller 16, a transmitter 17, a timer 18, and a measurement order sender 19.

The receiver 11 receives, via a base station (not shown), a signal, e.g., a calling signal or a pilot signal strength measurement message (hereinafter referred to as "measurement message") from a mobile station (not shown). The detector 12 detects whether or not a measurement message received by the receiver 11 contains a pilot signal strength of a cell covered by another system. If the detector 12 detects that the measurement message received by the receiver 11 contains the pilot signal strength of the cell covered by the other system, then the changer 13 reads a margin value corresponding to the cell from the adjacent cell information table 14.

The adjacent cell information table 14 stores a list of pilot signal numbers of cells adjacent to respective cells covered by its own system, i.e., the CDMA mobile communication system, and margin values established for the respective adjacent cells. The changer 13 subtracts the margin value read from the adjacent cell information table 14 from the pilot signal strength of the cell for thereby changing the pilot signal strength.

If the detector 12 detects that the measurement message received by the receiver 11 contains the pilot signal strength of the cell covered by the other system, then the hand-off decision unit 15 determines whether the pilot signal strength changed by the changer 13 has reached a preset threshold value for executing an intersystem hand-off or not.

If the pilot signal strength changed by the changer 13 has reached the preset threshold value, then the hand-off decision unit 15 executes an intersystem hand-off. if the pilot signal strength changed by the changer 13 has not reached the preset threshold value, then the hand-off decision unit 15 sets the timer 18 for requesting the mobile station to report a measurement message.

If the detector 12 does not detect that the measurement message received by the receiver 11 contains a pilot signal strength of a cell covered by another system, then the hand-off decision unit 15 determines whether the pilot signal strength contained in the measurement message received by the receiver 11 has reached a preset threshold value for executing a hand-off, i.e., a soft hand-off or a hard hand-off, or not.

Based on the decision made by the hand-off decision unit 15, the hand-off controller 16 controls an intersystem hand-off, a soft hand-off, and a softer hand-off. Since the intersystem hand-off, the soft hand-off, and the softer hand-off are known control processes, their explanation will be omitted.

The transmitter 17 transmits a signal for the mobile station, e.g., a calling signal or a pilot strength measurement order, to the base station.

When the timer 18 is set by the hand-off decision unit 15, the timer 18 starts measuring time. When the timer 18 reaches a preset time value, it reports a timeout to the measurement order sender 19. In response to the reported timeout, the measurement order sender 19 sends a pilot strength measurement order via the transmitter 17 to the base station.

As shown in Table 1 below, the adjacent cell information table 14 stores cell IDs, adjacent pilot signal numbers of "own system cell N", "other system cell B", and "own system cell M", and margin values corresponding to the respective adjacent pilot signal numbers.

Table 1

In Table 1, the margin values corresponding to the "own system cell N" and the "own system cell M" are "0", and the margin value corresponding to the "other system cell B" is "xx".

Figure 3:
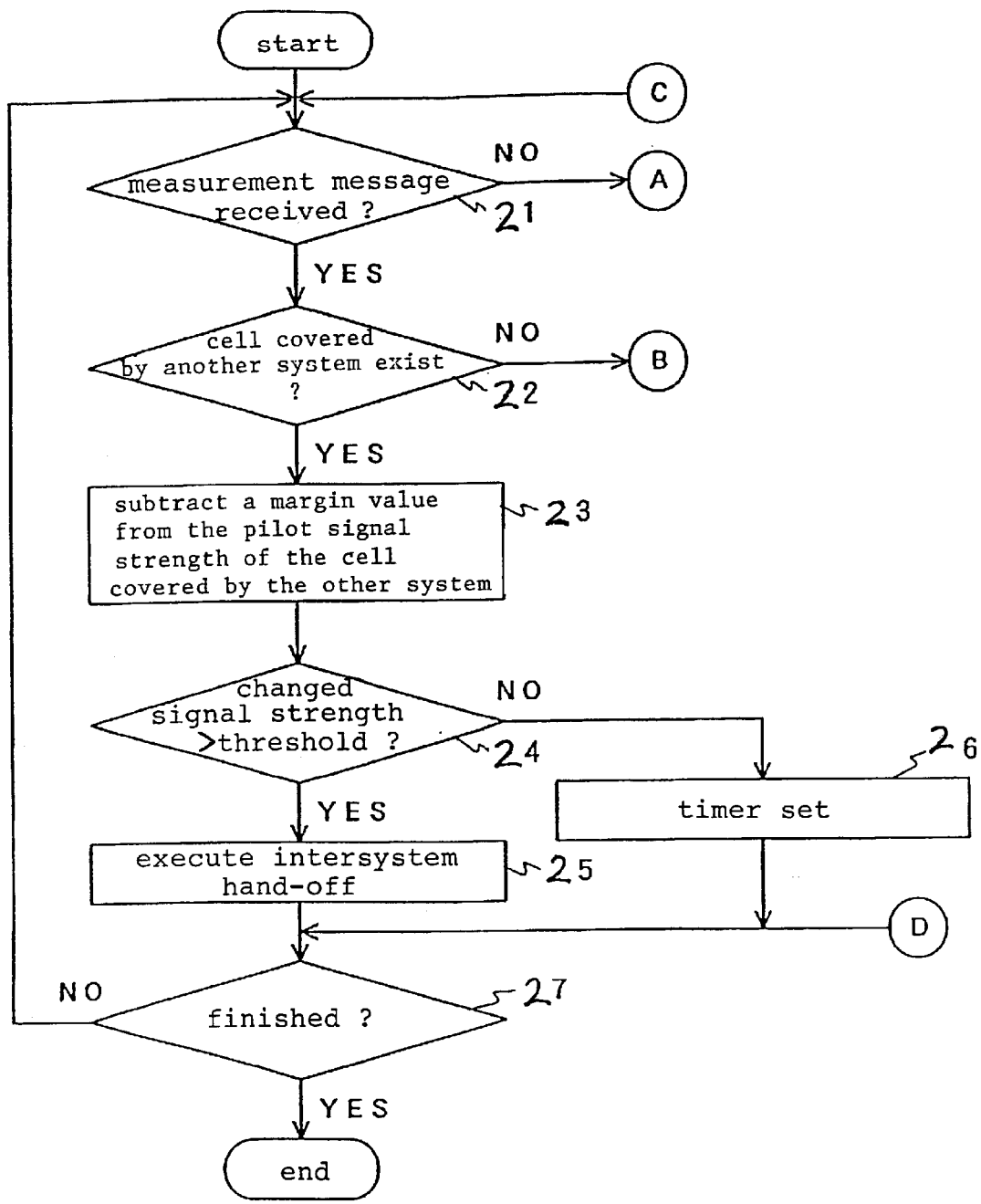
FIGS. 3 through 5 are a flowchart of a processing sequence of the base station controller shown in FIG. 2.
Figure 4:
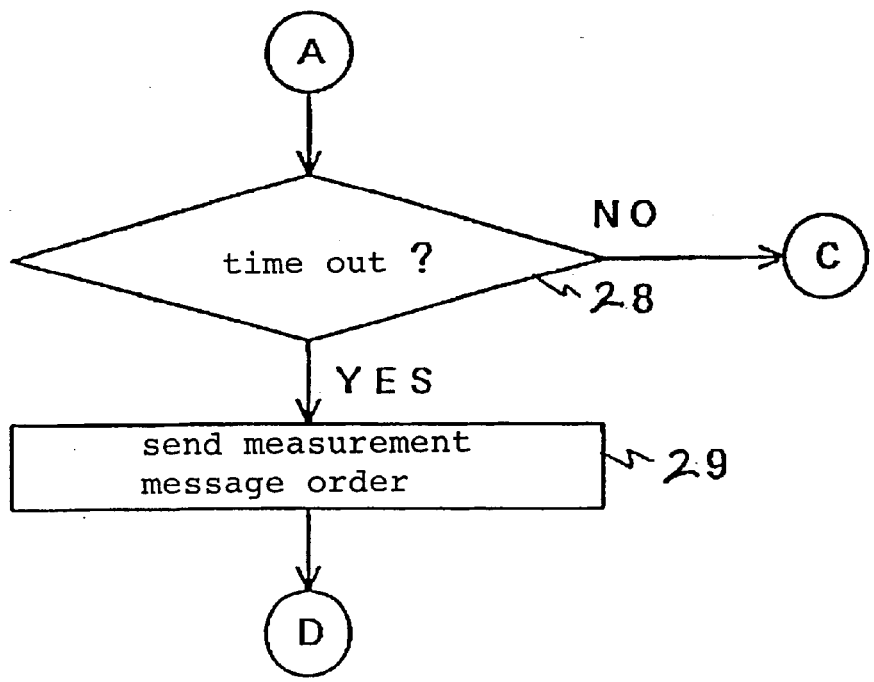
Figure 5:
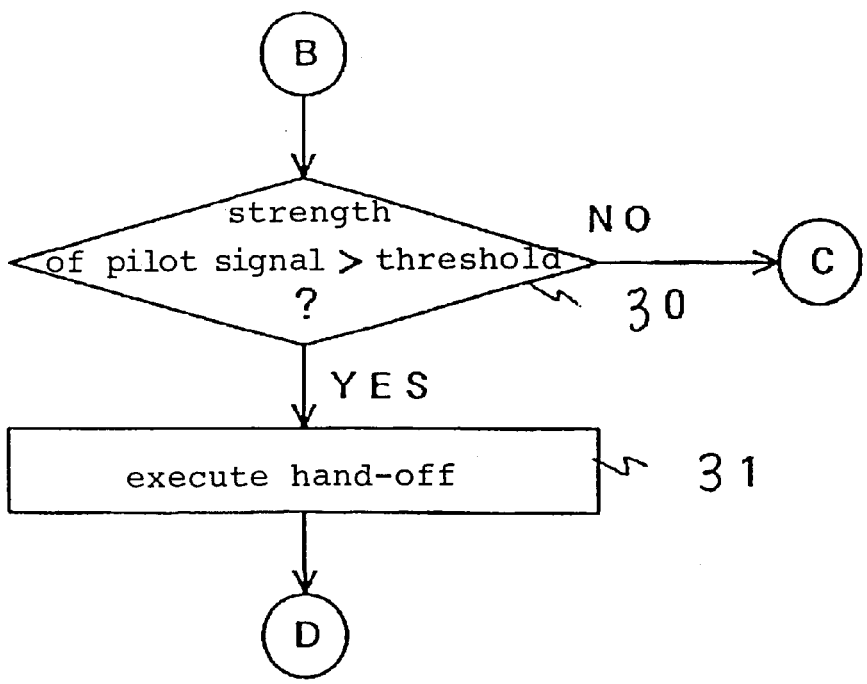

FIGS. 3 through 5 show a processing sequence of the base station controller 1 shown in FIG. 2. The processing sequence of the base station controller 1 of the CDMA mobile communication system according to the embodiment of the present invention will be described below with reference to FIGS. 1 through 5 and Table 1. The processing sequence of the base station controller 1 which is shown in FIGS. 3 through 5 is performed when the various parts of the base station controller 1 execute a program stored in a control memory (not shown), which may be a ROM (Read-Only Memory), an IC (Integrated Circuit) memory, or the like.

A system operation for determining the execution of an intersystem hand-off after the reception of a measurement message containing the pilot signal strength of a cell covered by another system from the mobile station 3 will be described below. It is assumed that the mobile station 3 is connected to the base station 2-1 and supplies a measurement message via the base station 2-1 to the base station controller 1.

In steps 21, 22 shown in FIG. 3, the detector 12 checks whether a measurement message received by the receiver 11 contains a previously reported cell covered by another system or not. If there is a cell covered by another system, then the changer 13 subtracts a margin value (shown in Table 1) corresponding to the cell in the adjacent cell information table 14 from the pilot signal strength of the cell covered by the other system, thus changing the pilot signal strength instep 23. The hand-off decision unit 15 determines whether the pilot signal strength changed by the changer 13 has reached a preset threshold value for executing an intersystem hand-off or not in step 24.

If the pilot signal strength has reached the preset threshold value, then the hand-off controller 16 executes an intersystem hand-off in step 25. If the pilot signal strength has not reached the preset threshold value, then the hand-off decision unit 15 sets the timer 18 for requesting the mobile station to report a measurement message in step 26.

If there is not a cell covered by another system, then it is determined that the mobile station 3 has moved away from the other system. The hand-off decision unit 15 does not make the above decision, but determines whether the pilot signal strength contained in the measurement message received by the receiver 11 has reached a threshold value for executing a hand-off, e.g., a soft hand-off or a softer hand-off, or not in step 30 shown in FIG. 5.

If the pilot signal strength has reached the threshold value, then the hand-off controller 16 executes a soft hand-off or a softer hand-off in step 31.

If the timer 18 set in step 26 undergoes a timeout in step 28 shown in FIG. 4, then the measurement order sender 19 sends a pilot strength measurement order via the transmitter 17 and the base station 2-1 to the mobile station 3 in step 29.

When the mobile station 3 receives the pilot strength measurement order from the transmitter 17 of the base station controller 1 via the base station 2-1, the mobile station 3 transmits a latest measurement message via the base station 2-1 to the base station controller 1. The base station controller 1 is triggered by the transmitted latest measurement message to perform the processing operation in steps 21–26, and an intersystem hand-off is executed if the conditions are satisfied.

The base station controller 1 repeats the above processing operation until it is finished (steps 21–27 in FIG. 3, steps 28, 29 in FIG. 4, and steps 30, 31 in FIG. 5). Specifically, if a cell covered by an adjacent other system is reported based on a threshold value, then an intersystem hand-off is executed, or a measurement message is periodically reported to the mobile station 3 until a cell covered by an adjacent other system disappears from the report.

Figure 6:
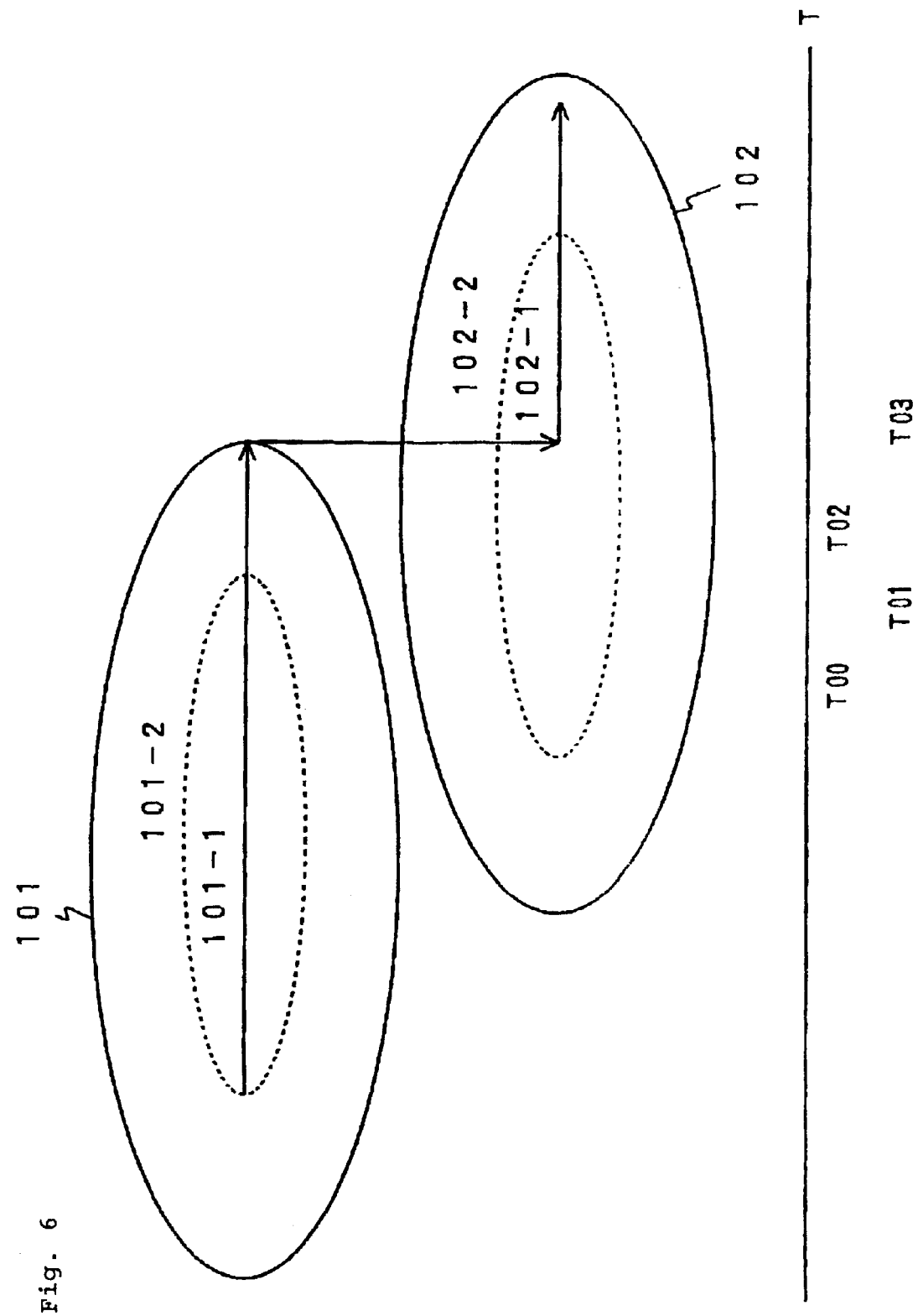
FIG. 6 is a diagram illustrative of the manner in which the CDMA mobile communication system operates when a mobile station moves from a cell covered by a system of its own to a cell covered by another system at a system boundary in the operation sequence of the base station controller.
Figure 7:
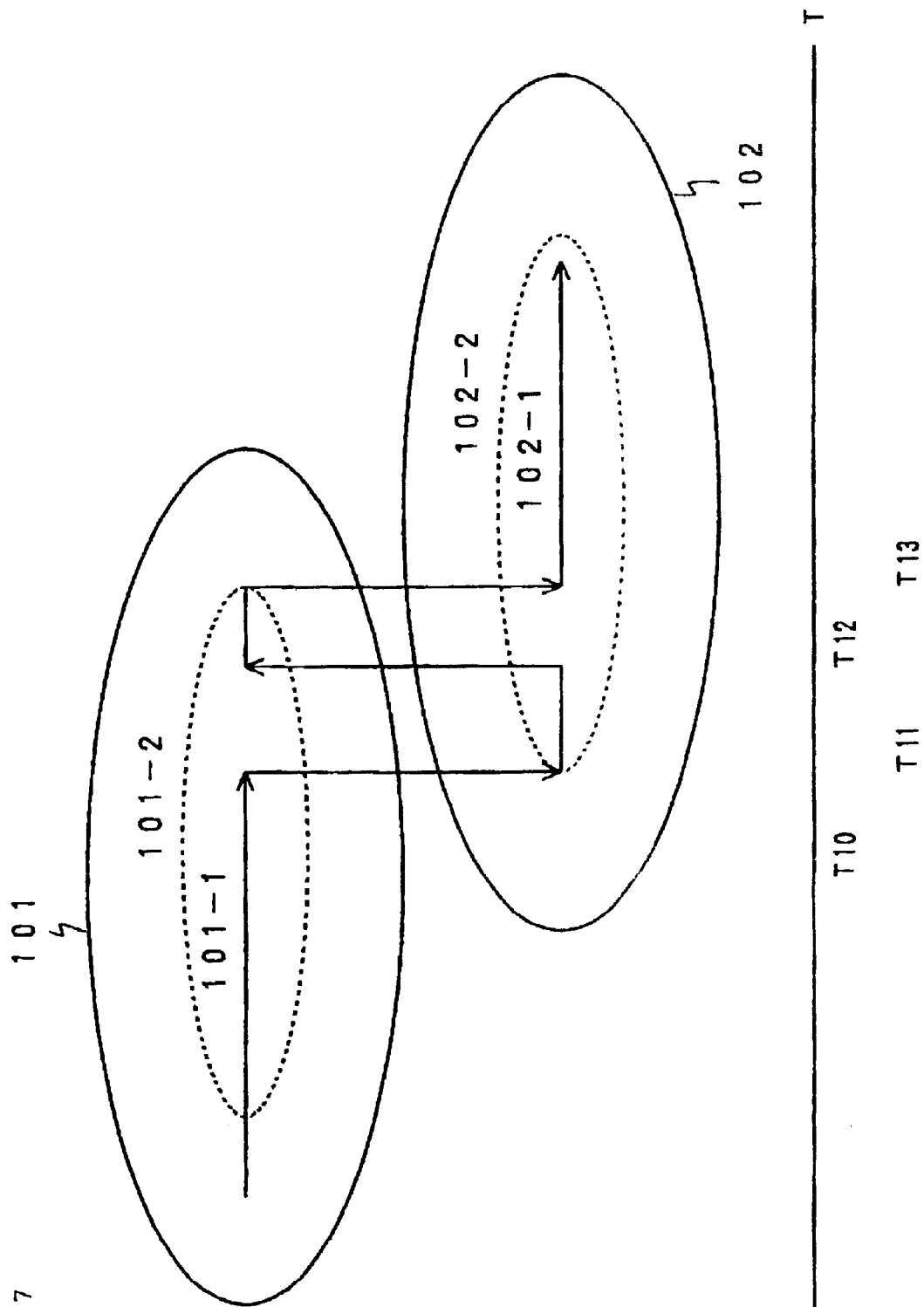
FIG. 7 is a diagram illustrative of the manner in which a conventional CDMA mobile communication system operates when a mobile station moves from a cell covered by a system of its own to a cell covered by another system at a system boundary.

FIG. 6 is illustrative of the manner in which the CDMA mobile communication system operates when the mobile station moves from a cell covered by its own system to a cell covered by another system at a system boundary in the operation sequence of the base station controller, and FIG. 7 is illustrative of the manner in which a conventional CDMA mobile communication system operates when the mobile station moves from a cell covered by its own system to a cell covered by another system at a system boundary.

A system operation when the mobile station moves from a cell covered by its own system to a cell covered by another system will be described below with reference to FIGS. 6 and 7. In FIGS. 6 and 7, it is assumed that a cell 101 covered by the own system includes an area 101-1 where the pilot signal strength exceeds a threshold value and an area 101-2 where the pilot signal strength is lower than the threshold value, and that a cell 102 covered by an adjacent other system includes an area 102-1 where the pilot signal strength exceeds a threshold value and an area 102-2 where the pilot signal strength is lower than the threshold value. The cells 101, 102 overlap each other.

In FIG. 7, even when the mobile station 3 has moved to a position T10 in the area 101-1 of the cell 101 covered by the own system, since the pilot signal intensity of the cell covered by the other system is lower than the threshold value, the mobile station 3 continues to move without reporting a measurement message via the base station 2-1 to the base station controller 1.

When the mobile station 3 moves to a position T11, not only the pilot signal strength of the cell covered by the own system, but the pilot signal strength of the cell covered by the other system, exceed the threshold value. Therefore, the mobile station 3 reports a measurement message via the base station 2-1 to the base station controller 1, and the base station controller 1 performs an intersystem hand-off.

With the intersystem hand-off performed, the mobile station 3 moves in the area 102-1 of the cell 102 covered by the other system. However, since the mobile station 3 measures the pilot signal strength of the cell covered by the own system and the measured pilot signal strength exceeds the threshold value, the mobile station 3 reports a measurement message via the base station 2-1 to the base station controller 1 at a position T12.

An intersystem hand-off is performed again, and the mobile station 3 moves in area 101-1 in the cell 101 covered by the own system. When the mobile station 3 moves to a position T13, because the pilot signal strength of the cell covered by the other system exceeds the threshold value, the mobile station 3 reports a measurement message via the base station 2-1 to the base station controller 1. Therefore, the base station controller 1 performs an intersystem hand-off, and the mobile station 3 moves in the area 102-1 in the cell 102 covered by the other system.

Now, the pilot signal strength of the cell covered by the own system becomes lower than the threshold value. Subsequently, the mobile station 3 will not report a measurement message via the base station 2-1 to the base station controller 1. As described above, while the mobile station 3 is moving between the position T11 and the position T12, useless intersystem hand-offs are carried out. Stated otherwise, though the area 101-1 is still available for the mobile station 3 to move in the cell covered by the own system, the mobile station 3 moves to the area 102-1 in the cell 102 covered by the other system.

In FIG. 6, the data representative of the margin values for the respective adjacent cells shown in Table 1 are used. The data are used to perform an intersystem hand-off if a value produced when a margin value indexed by the cell covered by the other system is subtracted from the pilot signal strength of the cell covered by the other system exceeds a threshold value.

When the mobile station 3 moves in the area 101-1 in the cell 101 covered by the own system to a position TOO, since the pilot signal strength of the cell covered by the own system exceeds the threshold value, the mobile station 3 reports a measurement message via the base station 2-1 to the base station controller 1.

However, the value produced when the margin value is subtracted from the pilot signal strength of the cell covered by the other system does not reach a threshold value for executing an intersystem hand-off, no hand-off is performed.

Thereafter, the mobile station 3 periodically reports a latest measurement message via the base station 2-1 to the base station controller 1 at positions T01, T02. Since the value produced when the margin value is subtracted from the pilot signal strength of the cell covered by the other system still does not reach the threshold value, no hand-off is performed.

When the mobile station 3 moves to a position T03, the value produced when the margin value is subtracted from the pilot signal strength of the cell covered by the other system, which is indicated by the measurement message reported to the base station controller 1, reaches the threshold value, an intersystem hand-off is executed.

Inasmuch as the pilot signal strength of the cell covered by the own system is weak, an intersystem hand-off for the mobile station 3 to return to the cell 101 covered by the own system is not carried out. In the illustrated embodiment, an intersystem hand-off is performed in the outer area 101-2 in the cell 101 covered by the own system.

When an intersystem hand-off is thus performed, since the pilot signal strength of the cell covered by the own system is weak, after the mobile station 3 has moved to the area 102-1 in the cell 102 covered by the other system, an intersystem hand-off is not carried out for the mobile station 3 to return to the cell 101 covered by the own system. Because an intersystem hand-off is performed in the outer area 101-2 in the cell 101 covered by the own system, the cell diameter is not reduced.

Therefore, when an intersystem hand-off is executed, any unwanted back-and-forth repetition of intersystem hand-offs is prevented from occurring. The speech quality of calls is increased because short breaks of speech which would otherwise happen due to repeated intersystem hand-offs that are hard hand-offs are reduced. The entire service area of the own system can effectively be used because the cell radius at a system boundary is not reduced.

While a preferred embodiment of the present invention has been described using specific terms, such description is for illustrative purposes only, and it is to be understood that changes and variations may be made without departing from the spirit or scope of the following claims.

What is claimed is:

1. A method of controlling an intersystem hand-off to switch a mobile station connected to a first base station of its own system to a second base station of an adjacent other system, comprising:

detecting information included in a report from said mobile station and representing a signal strength of a pilot signal from said second base station;

if said signal strength of said pilot signal from said second base station is detected, subtracting a corresponding of said pilot signal; and executing said intersystem hand-off to said adjacent other system, if said changed signal strength of said pilot signal exceeds a predetermined threshold value.

2. A method according to claim 1, further comprising:

reporting said signal strength of said pilot signal from said second base station to said first base station, to which said mobile station is connected, if said mobile station detects a state change of a strength condition of a cell availability pilot signal, which has been indicated by said first base station in advance.

3. A method according to claim 2, further comprising:

reporting said signal strength of said pilot signal after a predetermined period of time, if said changed signal strength of said pilot signal does not exceed said threshold value.

\* \* \* \* \*